United States Patent [19]

O'Dell

[11] Patent Number: 5,041,222

[45] Date of Patent: Aug. 20, 1991

[54] SINGLE ENDLESS SCREEN FOR EXTRACTING LIQUID FROM A SLURRY

[75] Inventor: Michael S. O'Dell, Bluefield, W. Va.

[73] Assignee: Fairchild International Inc., Glen Lyn, Va.

[21] Appl. No.: 416,498

[22] Filed: Oct. 3, 1989

[51] Int. Cl.[5] .............................................. B01D 33/04
[52] U.S. Cl. ..................................... 210/386; 210/393; 210/396; 210/400; 210/406; 210/416.1; 210/498; 210/499; 162/352; 100/118
[58] Field of Search ............... 210/386, 393, 396, 400, 210/401, 406, 498, 499, 416.1; 100/118; 162/352, 363, 374, DIG. 1, 348

[56] References Cited

U.S. PATENT DOCUMENTS

| 3,165,440 | 1/1965 | Jordansson | 162/352 |
| 3,425,901 | 2/1969 | Koffskey, Jr. | 162/363 |
| 3,941,701 | 3/1976 | Stahl et al. | 210/401 |
| 4,250,036 | 2/1981 | Parshall | 210/406 |
| 4,285,816 | 8/1981 | Lee | 210/401 |

FOREIGN PATENT DOCUMENTS

| 184497 | 9/1985 | Japan | 210/400 |
| 1572731 | 8/1980 | United Kingdom | 210/406 |

OTHER PUBLICATIONS

B. A. Thorp, Hydrofoil Design and Application as an Evolving Science, Jan. 11, 1965, Paper Trade Journal, pp. 37–41.

Primary Examiner—Robert A. Dawson
Assistant Examiner—Matthew O. Savage
Attorney, Agent, or Firm—Cushman, Darby & Cushman

[57] ABSTRACT

Apparatus for extracting liquid from a slurry containing fine solids and liquid comprising an endless screen formed of woven monofilaments of thermoplastic material so as to define a multiplicity of small openings extending between opposite sides thereof and a supporting structure for supporting the endless screen for movement through initial and intermediate operative run portions along an underside thereof in such a way as to present an upper operative side thereof for the accumulation of solids thereon by the passage of liquid through the openings thereof. The screen supporting structure comprises a multiplicity of fixed closely spaced parallel bars formed of material having favorable wear and coefficient of friction characteristics with respect to the thermoplastic material of the endless screen. Each of the parallel bars has (1) an upwardly facing rounded surface engageable with the underside of the endless screen so as to support the same for movement thereover and (2) side surfaces extending downwardly from the rounded surface. The spacing between adjacent side surfaces of adjacent bars defines slots of a width sufficient to allow the passage of enough liquid therethrough to form a solids layer and solids cake without allowing the underside of the initial and intermediate operative run portions to enter the slots appreciably below the upwardly facing rounded surfaces of engagement.

22 Claims, 2 Drawing Sheets

FIG. 2.
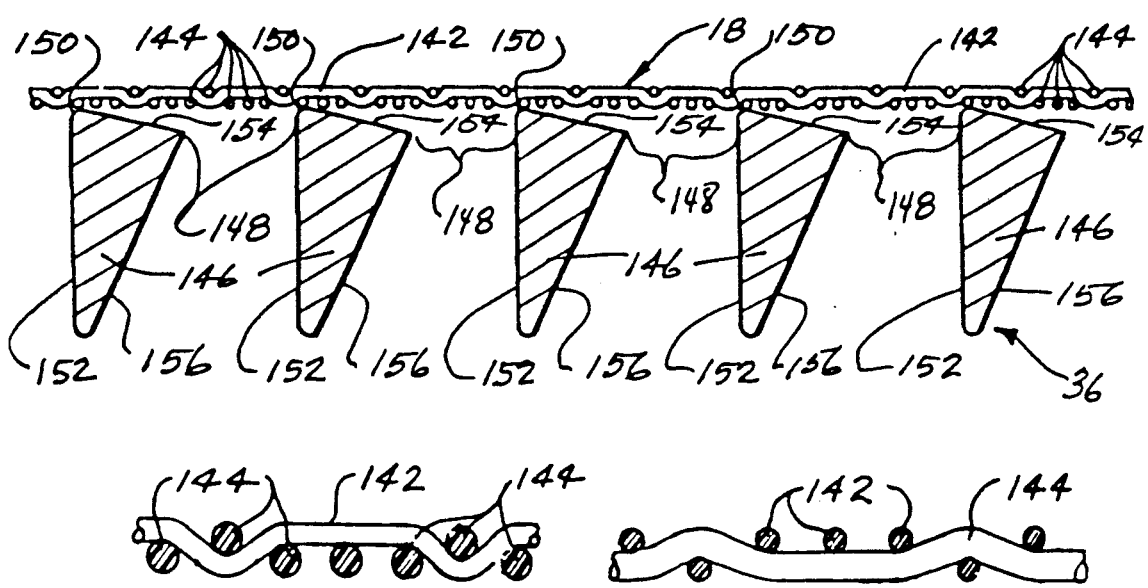
FIG. 3.  FIG. 4.
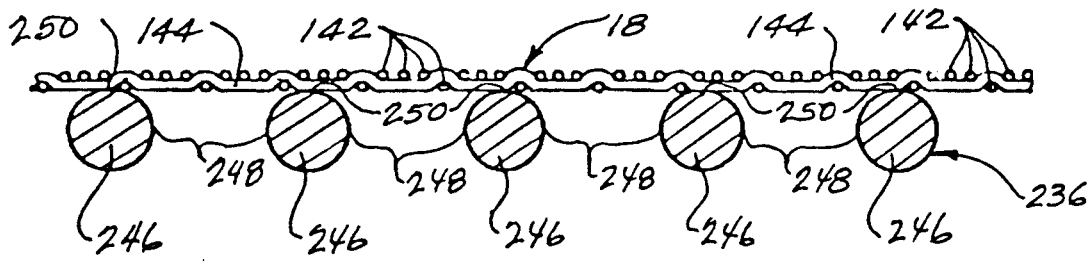
FIG. 5.

SINGLE ENDLESS SCREEN FOR EXTRACTING LIQUID FROM A SLURRY

This invention relates to the extracting of liquid from a slurry containing fine solids and liquid and, more particularly, to improvements in apparatus of this type such as disclosed in U.S. Pat. No. 4,285,816.

The apparatus disclosed in the aforesaid patent includes two endless screens which are trained about suitable rollers so as to present a combined operative run, that is, an operative run in which a fine mesh endless screen is mounted on and carried by the operative run of a coarse mesh screen. The operative run formed by the two endless screens passes over a perforated plate of a vacuum box. Suitable structure is provided for forming a pool of slurry above the operative run of both screens with the vacuum being drawn through the perforated plate of the vacuum box so as to cause solids in the slurry pool to accumulate in layer formation on the fine mesh screen as liquid in the slurry pool passes through the two screens and the perforated plate into the vacuum box. The solids cake that is ultimately formed in layer formation on the operative run of the fine mesh screen is then passed by a pressure-applying mechanism which serves to extract additional water from the cake after which it is removed. The two screens are trained about rollers so that they have separate return runs, each of which is suitably rinsed. The apparatus, as indicated in the specification, has operated with fine coal slurries to accomplish the liquid extraction. The problems which have been presented in the operation of the device are largely centered around the utilization of two separate endless screens. The present invention is based upon the proposition that the aforesaid problems of the patented apparatus can be drastically reduced if not cut in half by providing a device which could achieve the same results or better without using two endless screens.

The present invention has for its object the improvement of the apparatus of the patent in such a way as to eliminate the second or coarse mesh endless screen of the patented apparatus and to modify the remaining components such that the functions performed by the eliminated coarse mesh screen are otherwise provided for. In accordance with the principles of the present invention, this objective is obtained by providing an apparatus for extracting liquid from a slurry containing fine solids and liquid which comprises an endless screen formed of woven monofilaments of thermoplastic material so as to define a multiplicity of small openings extending between opposite sides thereof. The screen is trained about a series of rollers so as to define an operative run and a return run. The operative run includes an upwardly inclined initial portion, an intermediate portion, and a final portion. A structure is provided for receiving a slurry supply and containing a pond of slurry above the upwardly inclined initial operative run portion. Another structure is provided for supporting the endless screen for movement through the initial and intermediate operative run portions along an underside thereof in such a way as to present an upper operative side thereof for the accumulation of solids thereon by the passage of liquid through the openings thereof. At least one of the rollers about which the endless screen is trained is driven to effect movement of the endless screen in a direction such that the operative run proceeds from the initial operative run portion to the final operative run portion. A suction-creating assembly is provided on the underside of the initial and intermediate operative run portions through the screen supporting structure so as to cause solids in the slurry to accumulate on the operative side of the initial operative run portion as a continuous layer movable within the screen and so as to extract liquid from the continuous layer of solids through the endless screen and the endless screen supporting structure while on the intermediate operative run portion so as to form a continuous solids cake on the operative side of the endless screen entering the final operative run portion. A pressure-applying mechanism is provided on the final operative run portion for compressing the solids cake on the final operative run portion to extract additional liquid therefrom while on the final operative run portion. A stripping mechanism is provided for stripping the liquid extracted solids cake from the operative side of the endless screen after being compressed by the pressure-applying mechanism. Back flushing assemblies are provided for back flushing the endless screen on the return end thereof after the solids cake has been stripped therefrom by the stripping mechanism. The screen supporting structure comprises a multiplicity of fixed closely spaced parallel bars formed of a material having favorable wear and coefficient of friction characteristics with respect to the thermoplastic material of the endless screen. Each of the parallel bars has (1) an upwardly facing rounded surface engageable with the underside of the endless screen so as to support the same for movement thereover and (2) side surfaces extending downwardly from the rounded surfaces. The spacing between adjacent side surfaces of adjacent bars defines slots of a width sufficient to allow the passage of enough liquid therethrough to form the layer and the cake without allowing the underside of the initial and intermediate operative run portions to enter the slots appreciably below the upwardly facing rounded surfaces of engagement to thereby provide a favorable resistance to the movement of the endless screen through the initial and intermediate operative run portions by virtue of the amount of surface area of engagement between the underside of the endless screen and the rounded upwardly facing surfaces of the bars, the coefficient of friction of the materials thereof and the engagement pressure therebetween enhanced by the suction created by the suction-creating mechanism.

Another object of the present invention is the provision of an apparatus of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is a diagrammatic side elevational view of an apparatus embodying the principles of the present invention;

FIG. 2 is an enlarged fragmentary cross-sectional view of the operative run of the endless screen and the supporting structure constructed in accordance with the principles of the present invention which supports the same, the cross-sectional view being taken along a plane parallel with the direction of movement of the endless screen looking in a perpendicular direction toward the side of the apparatus;

FIG. 3 is an enlarged fragmentary sectional view of the endless screen taken along a plane parallel with the direction of movement of the endless screen looking in a perpendicular direction toward the side of the screen; and FIG. 4 illustrates the cross-section of the screen viewed along a plane perpendicular to the direction of movement looking in the direction of movement;

FIG. 5 is an enlarged fragmentary sectional view of the endless screen and a supporting structure of a modified form embodying the principles of the present invention, the section being taken along a plane perpendicular to the direction of movement of the screen looking in the direction of movement.

Figure 1:
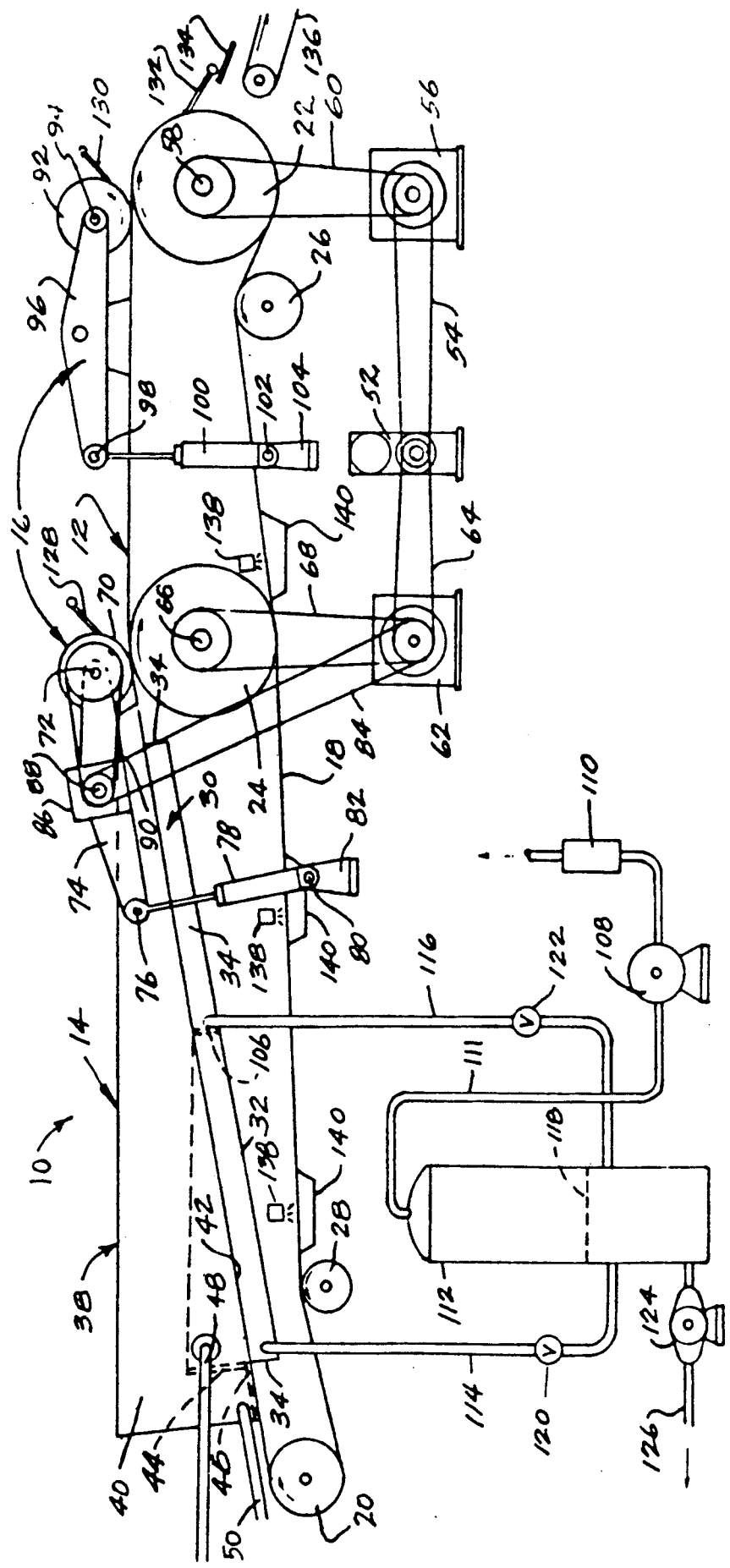

Referring now more particularly to the drawings, there is shown therein an apparatus, generally indicated at 10, for extracting liquid from a slurry containing fine solids and liquid which is constructed in accordance with the principles of the present invention. The apparatus is generally constructed in accordance with the disclosure contained in the aforesaid U.S. Pat. No. 4,285,816, the disclosure of which is hereby incorporated by reference into the present specification. As shown, the apparatus 10 basically differs from the apparatus of the patent in that there is provided a single endless screen assembly, generally indicated at 12, rather than a pair of endless screens one of which is a fine mesh screen and the other of which is a coarse mesh screen. As shown, the apparatus 10 includes a slurry feed and vacuum box assembly, generally indicated at 14, which cooperates with the single screen assembly 12 to form a layer of solids and finally a solids cake on the screen assembly. A pressure-applying mechanism, generally indicated at 16, is provided for extracting additional liquid from the solids cake while on the screen assembly 12. Preferably, the pressure-applying mechanism 16 of the present apparatus 10 is of a two-stage variety rather than the single-stage variety which is disclosed in the patent, although the present invention contemplates single-stage as well as multiple-stage pressure-applying mechanisms.

The endless screen assembly 12 includes an endless screen 18 which is trained about two end rollers 20 and 22 so as to define an upper operative run and a lower return run, an intermediate roller 24, and a pair of spaced return run idler rolls 26 and 28.

The slurry feed and vacuum box assembly 14 includes a vacuum box structure, generally indicated at 30, which is formed by an imperforate generally rectangularly shaped sheet metal bottom wall 32 having sheet metal L-shaped walls 34 extending upwardly from the peripheral edges thereof. One leg of the L-shaped walls 34 constitutes the sides of the box structure while the other leg of the L-shaped walls 34 constitute top flanges defining a large central opening in the top of the box structure 30. As shown, the box structure 30 is disposed at an incline to the horizontal and has a width slightly greater than the width of the screen 18, a length which is slightly less than the distance between the end roller 20 and the intermediate roller 24 and a height which is of a dimension considerably less than either the width or the length. As previously indicated, the box structure 30 is enclosed on its bottom and four upright sides by suitable sheet metal and along its top surface by an inwardly extending sheet metal peripheral flange which defines an opening within which a support structure, generally indicated at 36 (see FIG. 2), is fixed for supporting an initial portion and an intermediate portion of the upper operative run of the endless screen 18.

The slurry feed and vacuum box assembly 14 also includes a slurry feed structure, generally indicated at 38, which extends above the vacuum box structure 30 and includes an upright generally U-shaped sheet metal wall 40 including generally triangularly shaped sides which include inwardly extending flanges 42 fixed to the associated upper edge of opposite longitudinally extending sides of the box structure 30, and an end which is spaced from the adjacent transversely extending side of the vacuum box 30. Extending between the sides of the U-shaped wall 40 in spaced relation to the end thereof is a weir plate 44, the lower end of which is rigidly connected with the lower edge of the end of the U-shaped wall 40 by a bottom wall 46. The position of the weir plate 44 is adjacent the associated transverse side of the vacuum box 30 which extends upwardly from that side in an inclined relationship.

The weir 44 serves to confine a supply of slurry fed, as by feed pipe 48, in the space between the sides of the U-shaped wall 40 and the weir 46 which is above the initial operative run portion of the endless screen 18 so as to define a pool of slurry therein. Excess slurry fed by the feed pipe 48 flows over the weir 44 and is returned to the source by a return pipe 50. The weir 44 thus serves to maintain the slurry pool at a predetermined level which is indicated by the broken lines in FIG. 1.

The initial operative run portion of the endless screen 18 is defined as that portion of the operative run of the endless screen 18 which passes over the top of the vacuum box 30 in supported relation therewith from the initial edge of the leading transverse side of the box to the portion of the box where the liquid level of the slurry pool is contained. The intermediate operative run portion of the endless screen 18 is that portion which moves over the remaining portion of the upper wall of the vacuum box structure 30. The final operative run portion of the endless screen 18 is the portion of the screen which extends from the trailing edge of the vacuum box structure 30 and around the end roller 22. Preferably, the end roller 22 is a drive roller for effecting a movement of the endless screen 18 in a direction such that its operative run moves through the initial portion, the intermediate portion, and then the final portion. Any suitable means may be provided for driving the end roller 22. FIG. 1 illustrates diagrammatically a motor and speed reducer 52 which is connected by suitable power transmission means, such as a belt assembly 54, with a gear box 56 which, in turn, is connected with a support shaft 58 of the end roller 22, by a suitable belt and pulley assembly 60.

It is preferable in accordance with the principles of the present invention to also drive the intermediate roller 24. In this regard, there is provided a second gear box assembly 62 which is driven by a second pulley and belt assembly 64 from the motor and speed reducer 52. A support shaft 66 of the intermediate roller 24 is driven by a suitable belt and pulley assembly 68 extending between the gear box 62 and the shaft 66.

As previously indicated, the pressure applying mechanism 16 is preferably of a two-stage variety. Accordingly, as shown, there is provided a first press roll 70 which is disposed above the operative run of the endless screen 18 at a position in the final portion thereof which is adjacent the intermediate roller 24. The first stage press roll 70 is rotatably mounted by a shaft 72 on one end of a lever 74 pivoted about a suitable fixed axis. The pivotal mounting of the lever 74 is intermediate the end thereof which carries the first stage press roll 70 and an opposite end thereof which is pivotally connected, as at 76, with the piston rod end of an air piston and cylinder unit 78, the cylinder end of which is pivoted as at 80 with a fixed bracket 82.

The pressurized air piston and cylinder unit 78 serves to bias the press roll 70 into pressurized engagement with solids cake on the upper surface of the operative run of the screen 18, the lower surface of which is immediately supported by the intermediate roller 24. The pressure between the press roll 70 and roller 24 serves to extract additional liquid from the solids cake carried by the final portion of the operative run of the endless screen 18. Preferably, the first stage press roll 70 is driven in sequence with the driving speed of the intermediate roller 24. Any suitable means may be provided for effecting this synchronous driving action and, as schematically shown, a belt and pulley assembly 84 extends from the gear box 62 to a controlled transmission assembly 86 mounted for pivotal movement with the lever 74. The controlled transmission assembly 86 includes an input shaft 88 which is coincident with the axis of the lever 74 and carries a pulley of the belt and pulley assembly 84. A separate output shaft rotating on the same axis (in an opposite direction in the schematic view illustrated) is connected with the press roll shaft 72 through another belt and pulley assembly 90. It will be understood that the controlled transmission assembly 86 may be controlled by computer or other well known arrangements to achieve the driving movement so that the rotational speeds required will be synchronized.

The pressure applying mechanism 16 includes a second stage press roll 92 which is rotatably mounted on the end of a shaft 94 carried by one end of a lever 96 pivoted about a fixed pivotal axis intermediate the ends of the lever. An opposite end of the lever is pivoted, as at 98, to the piston rod end of pressurized air piston and cylinder unit 100. The cylinder end of the unit 100 is pivoted, as at 102, to a fixed bracket 104. Again, the pressurized air piston and cylinder unit 100 serves to resiliently bias the second stage press roll 92 into engagement with solids cake on the upper surface of the operative run of the screen 18 at a position above the end roller 22 so as to squeeze the solids cake between the second stage press roll 92 and the end roller 22 and effect an extraction of still additional liquid from the solids cake.

Preferably, the vacuum box structure 30 is interiorly divided, as by a wall 106, at the juncture between the initial and intermediate operative run portions. Vacuum is provided for the vacuum box structure 30 by a vacuum pump 108 which exhausts to the atmosphere through a muffler 110 as illustrated. In order to minimize the amount of power required to form the vacuum, the vacuum pump 108 is connected, as by conduit 111, to the upper end of a liquid separator 112 which is disposed below the level of the vacuum box structure 30. Connections are made to each division of the vacuum box structure 30 by means of conduits 114 and 116, respectively, which enter the separator 112 at a level below the liquid level 118, as shown. Suitable valves 120 and 122 are provided in the conduits 114 and 116, respectively, to control the degree of vacuum. Liquid is removed from the lower portion of the separator 112 by means of a pump 124 and is conducted either to further processing operations or back to some other point for utilization through the conduit 126. By locating the liquid separator 112 at a level well below the vacuum box structure 30, the columns of liquid in the conduits 114 and 116 will aid in reducing the pressure in the vacuum box structure 30 so that the power requirements of the system are minimized.

Removal of solids is effected by means of doctor blades 128 and 130 which bear against the first and second endless press rolls 70 and 92 respectively, and a doctor blade 132 which bears against the endless screen 18 on the end roller 22. Any solids from the doctor blades 128 and 130 fall onto the endless screen 18 below the doctor blades and are carried to the doctor blade 132 from which they are deposited on a chute 134 which deposits the solids on a conveyor belt 136.

Mounted above the return run of the endless screen is a series of spaced cleaning showers 138, the water from which passes through the screen and is caught in troughs 140.

The present invention is importantly concerned with the construction of the support structure 36 and the cooperating relationship thereof with the construction of the endless screen 18. It will be understood that the longitudinal edges of the initial and intermediate portions of the operative run of the endless screen 18 are supported for movement over the flanges provided by the longitudinally extending L-shaped walls 34 and that such edges cooperate with flap seals mounted thereover in accordance with the teachings of the aforesaid patent. Similarly, a flap valve seal is mounted over the screen as it passes over the flange on the leading transversely extending L-shaped wall 34.

The screen 18 is similar to the fine mesh screen described in the aforesaid patent. As best shown in FIGS. 3 and 4, a preferred embodiment of the endless screen 18 is a commercially available screen made by Huyck/Formex. The screen is of four-harness satin weave pattern utilizing polyester monofilaments 142 of a diameter of 0.0067 inches in the machine direction and polyester monofilaments 144 having a diameter size of 0.0083 inches in the cross machine direction. The screen 18 utilizes 56 monofilaments per inch in the cross machine direction and 80 monofilaments per inch in the machine direction. The satin weave pattern provides fine mesh openings extending from one side of the screen to the other. FIG. 3 illustrates the cross-section of the screen viewed along a plane in the direction of movement looking in a direction perpendicular to the direction of movement toward one side or longitudinal edge of the screen and FIG. 4 illustrates the cross-section of the screen viewed along a plane perpendicular to the direction of movement looking in the direction of movement. As can be seen from FIG. 3, the weave provides knuckles which extend over three cross machine monofilaments 144 in the direction of movement on the upper side of the operative run and, as shown in FIG. 4, knuckles extending under three machine monofilaments 142 in a direction perpendicular to the direction of movement on the underside of the operative run.

FIG. 2 illustrates an exemplary support structure 36 which is in the form of a commercially available bar screen manufactured by Conweld Industries Inc. The screen 36 is suitably fixed within the opening in the vacuum box structure 30 defined by the inwardly extending flanges of the L-shaped walls 34. As shown, the screen 36 is formed of a multiplicity of fixed parallel bars 146 which extend perpendicular to the direction of the endless screen movement so as to define parallel slots 148 therebetween. The bars 146 are of the "RC"

profile cross-sectional configuration. As shown, the bars 146 are of uniform generally web-shaped cross-sectional configuration with each bar 146 providing a upwardly facing rounded surface 150 positioned on a leading portion of the bar 146 with respect to the direction of endless screen movement. Each bar 146 includes a leading side surface 152 extending from the upwardly facing rounded surface 50 in a direction generally perpendicular to the direction of endless screen movement, an inclined side surface 154 extending from the upwardly facing rounded surface 150 in the direction of endless screen movement in downwardly diverging relation thereto and a trailing side surface 156 extending from the inclined side surface 154 in converging relation with respect to the leading side surface 152. The bars 146 define a series of parallel slots 148 which are approximately 0.12 inches between the closest distance between the side surfaces 156 and 152 of adjacent bars 146. The extent of the inclined side surface 154 measured in the direction of extent thereof from the rounded surface 150 to the juncture with trailing side surface 156 is approximately 3/32 inches so that the slots 148 constitute approximately 57% of the space occupied by the bars 146 of the fixed screen 36.

The bars 146 are preferably made of stainless steel which has both a favorable wear characteristic as well as a favorable coefficient of friction with respect to the polyester plastic material which forms the endless screen 18. The arrangement is such that the endless screen 18 is supported by the rounded surfaces 150 of the bars 146 at sufficiently closely spaced positions so that the underside of the initial and intermediate operative run portions of the endless screen 18 as it moves by the bars 146 does not appreciably enter the slots 148 below the upwardly facing rounded surfaces 150. This minimizes the area of contact and enables the endless screen 18 to be moved without applying excessive forces thereto, thus eliminating the need to provide a coarse screen for carrying the screen through the initial and intermediate operative runs where vacuum serves to draw the liquid through the screen and thus to materially add to the pressure between the are of contact between the endless screen 18 and the fixed support structure 36.

FIG. 5 illustrates another embodiment of the support structure which also is in the form of a fixed bar screen, generally indicated at 236. In FIG. 5, the cross-section is taken along a plane perpendicular to the direction of movement of the endless screen looking in the direction of movement. In this embodiment, the support structure 236 is formed by a fixed bar screen which is made up of a series of parallel bars 246 of circular cross-section, the bars 246 extending in the direction of movement of the endless screen 18 so as to define a series of parallel slots 248 therebetween. Again, the fixed bar screen 236 is a commercially available screen such as might be purchased from Conweld Industries Inc., the bars being made of uniform round cross-sectional configuration with a diameter of approximately 1/16 inches. As before, the bars are made of stainless steel and spaced apart approximately 0.080 inches rendering the slots approximately 56% of the space taken up by the bars. An upper arcuate surface 250 of the round bars 246 constitutes a rounded surface 260 which is engaged by the underside of the endless screen 18 so as to support the same for movement therealong. It is noted that the knuckles on the underside of the endless screen 18 extend transverse to the bars 246 and this, together with the longitudinal extent of the bars 246 being in the direction of travel, presents a highly desirable minimum area of contact at positions sufficiently close to prevent substantial entry of the endless screen 18 into the slots 250 while still maintaining adequate space to permit substantially unrestricted passage of liquid through the slots 250.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. Apparatus for extracting liquid from a slurry containing fine solids and liquid comprising an endless screen formed of woven monofilaments of thermoplastic material so as to define a multiplicity of small openings extending between opposite sides thereof, a series of rollers about which said endless screen is trained so as to define an operative run and a return run, said operative run including an upwardly inclined initial portion, an intermediate portion and a final portion, means for receiving a slurry supply and containing a pond of slurry above said upwardly inclined initial operative run portion, means for supporting said endless screen for movement through said initial and intermediate operative run portions along an underside thereof in such a way as to present an upper operative side thereof for the accumulation of solids thereon by the passage of liquid through the openings thereof, means for driving at least one of said rollers to effect movement of said endless screen in a direction such that the operative run proceeds from said initial operative run portion to said final operative run portion, means for creating a suction on the underside of the initial and intermediate operative run portions through said screen supporting means so as to cause solids in the slurry to accumulate on the operative side of the initial operative run portion as a continuous layer movable with the endless screen and so as to extract liquid from said continuous layer of solids through said endless screen and said screen supporting means while on the intermediate operative run portion so as to form a continuous solids cake on the operative side of said endless screen entering said final operative run portion, pressure applying means on said final operative run portion for compressing the solids cake on said final operative run portion to extract additional liquid therefrom while on said final operative run portion, means for stripping the liquid extracted solids cake from the operative side of the said endless screen after being compressed by said pressure applying means and means for back flushing said endless screen on the return run thereof after the solids cake has been stripped therefrom by said stripping means, said screen supporting means comprising a multiplicity of fixed closely spaced parallel bars formed of material having favorable wear and coefficient of friction characteristics with respect to the thermoplastic material of said endless screen, each of said parallel bars having (1) an upwardly facing rounded surface engageable with the underside of said endless screen so as to support the same for movement thereover and (2) side surfaces extending downwardly from said rounded surface, the spacing between adjacent side surfaces of adjacent bars defining slots of a width sufficient to allow the passage of enough liquid therethrough to form said layer and said cake without allowing the underside of the initial and intermediate operative run portions to enter said slots appreciably below the upwardly facing rounded surfaces of engagement to thereby provide a favorable resistance to the movement of the endless screen through said initial and intermediate operative run portions by virtue of the amount of surface area of engagement between the underside of said endless screen and the rounded upwardly facing surfaces of said bars, the coefficient of friction of the materials thereof and the engagement pressure therebetween enhanced by the suction created by said suction creating means.

2. Apparatus as defined in claim 1 wherein said pressure applying means includes a first stage press roll mounted above the operative side of the final operative run portion of said endless screen adjacent said intermediate operative run portion for biased movement toward a first roller of said series of rollers mounted in cooperating relation therebelow and a second stage press roll mounted above the operative side of the final operative run portion of said endless screen for biased movement toward a second roller of said series of rollers defining the end of the final operative run portion thereof.

3. Apparatus as defined in claim 2 wherein said first and second rollers and said first press roll are driven by said endless screen moving means to effect the movement of said endless screen.

4. Apparatus as defined in claim 1 wherein the parallel bars extend in the direction of endless screen movement.

5. Apparatus as defined in claim 4 wherein each bar is of uniform circular cross-sectional configuration.

6. Apparatus as defined in claim 1 wherein each bar is of uniform circular cross-sectional configuration.

7. Apparatus as defined in claim 6 wherein the material of said bars is stainless steel.

8. Apparatus as defined in claim 7 wherein the parallel bars extend in the direction of endless screen movement.

9. Apparatus as defined in claim 1 wherein said endless screen is woven with machine direction monofilaments extending in the direction of endless screen movement and cross-machine direction monofilaments extending in a direction perpendicular to the direction of endless screen movement, the machine direction monofilaments having a diameter dimension smaller than that of the cross-machine direction monofilaments.

10. Apparatus as defined in claim 9 wherein said endless screen is woven so as to form knuckles on the operative side extending in the direction of endless screen movement and knuckles on the underside extending in a direction perpendicular to the direction of endless screen movement.

11. Apparatus as defined in claim 10 wherein each knuckle on the underside of said endless screen is formed by a cross-machine direction monofilament extending across three machine direction monofilaments and each knuckle on the operative side of said endless screen is formed by a machine direction monofilament extending across three cross machine direction monofilaments.

12. Apparatus as defined in claim 11 wherein the thermoplastic material of said monofilaments is polyester.

13. Apparatus as defined in claim 1 wherein the material of said bars is stainless steel.

14. Apparatus as defined in claim 13 wherein the thermoplastic material of said monofilaments is polyester.

15. Apparatus as defined in claim 1 wherein the thermoplastic material of said monofilaments is polyester.

16. Apparatus for extracting liquid from a slurry containing fine solids and liquid comprising an endless screen formed of woven monofilaments of thermoplastic material so as to define a multiplicity of small openings extending between opposite sides thereof, a series of rollers about which said endless screen is trained so as to define an operative run and a return run, said operative run including an upwardly inclined initial portion, an intermediate portion and a final portion, means for receiving a slurry supply and containing a pond of slurry above said upwardly inclined initial operative run portion, means for supporting said endless screen for movement through said initial and intermediate operative run portions along an underside thereof in such a way as to present an upper operative side thereof for the accumulation of solids thereon by the passage of liquid through the openings thereof, means for driving at least one of said rollers to effect movement of said endless screen in a direction such that the operative run proceeds from said initial operative run portion to said final operative run portion, means for creating a suction on the underside of the initial and intermediate operative run portions through said screen supporting means so as to cause solids in the slurry to accumulate on the operative side of the initial operative run portion as a continuous layer movable with the endless screen and so as to extract liquid from said continuous layer of solids through said endless screen and said screen supporting means while on the intermediate operative run portion so as to form a continuous solids cake on the operative side of said endless screen entering said final operative run portion, pressure applying means on said final operative run portion for compressing the solids cake on said final operative run portion to extract additional liquid therefrom while on said final operative run portion, means for stripping the liquid extracted solids cake from the operative side of the said endless screen after being compressed by said pressure applying means and means for back flushing said endless screen on the return run thereof after the solids cake has been stripped therefrom by said stripping means, said screen supporting means comprising a multiplicity of fixed closely spaced parallel bars formed of material having favorable wear and coefficient of friction characteristics with respect to the thermoplastic material of said endless screen, each of said parallel bars having (1) an upwardly facing rounded surface engageable with the underside of said endless screen so as to support the same for movement thereover and (2) side surfaces extending downwardly from said rounded surface, the spacing between adjacent side surfaces of adjacent bars defining slots of a width sufficient to allow the passage of enough liquid therethrough to form said layer and said cake without allowing the underside of the initial and intermediate operative run portions to enter said slots appreciably below the upwardly facing rounded surfaces of engagement to thereby provide a favorable resistance to the movement of the endless screen through said initial and intermediate operative run portions by virtue of the amount of surface area of engagement between the underside of said endless screen and the rounded upwardly facing surfaces of said bars, the coefficient of friction of the materials thereof and the engagement pressure therebetween enhanced by the suction created by said suction creating mean each bar being of uniform generally wedged shaped cross-sectional configuration, the upwardly facing rounded surface of each bar being positioned on a leading portion of the bar with respect to the direction of endless screen movement, each bar including a leading side surface extending from said upwardly facing rounded surface in a direction perpendicular to the direction of endless screen movement, an inclined side surface extending from said upwardly facing rounded surface in the direction of endless screen movement in downward diverging relation thereto and a trailing side surface extending from said inclined side surface in converging relation with respect to said leading side surface.

17. Apparatus as defined in claim 16 wherein said endless screen is woven so as to form knuckles on the operative side extending in the direction of endless screen movement and knuckles on the underside extending in a direction perpendicular to the direction of endless screen movement.

18. Apparatus as defined in claim 17 wherein said endless screen is woven with machine direction monofilaments extending in the direction of endless screen in a movement and cross-machine direction monofilaments extending in a direction perpendicular to the direction of endless screen movement, the machine direction monofilaments having a diameter dimension smaller than that of the cross-machine direction monofilaments.

19. Apparatus as defined in claim 18 wherein each knuckle on the underside of said endless screen is formed by a cross-machine direction monofilament extending across three machine direction monofilaments and each knuckle on the operative side of said endless screen is formed by a machine direction monofilament extending across three cross machine direction monofilaments.

20. Apparatus as defined in claim 19 wherein the thermoplastic material of said monofilaments is polyester.

21. Apparatus as defined in claim 20 wherein the material of said bars is stainless steel.

22. Apparatus as defined in claim 16 wherein the material of said bars is stainless steel.

* * * * *